United States Patent [19]
Stewart et al.

[11] Patent Number: 5,173,180
[45] Date of Patent: Dec. 22, 1992

[54] DOMESTIC WATER CONSERVATION SYSTEM

[76] Inventors: Gary Stewart, 2838 N. Myers St., Burbank, Calif. 91504; John M. Bozeman, 530 E. Grinnell Dr., Burbank, Calif. 91501

[21] Appl. No.: 623,074

[22] Filed: Dec. 6, 1990

[51] Int. Cl.⁵ .............................................. B01D 36/00
[52] U.S. Cl. .................................... 210/167; 210/170; 210/196
[58] Field of Search ................ 210/167, 170, 194, 196

[56] References Cited

U.S. PATENT DOCUMENTS 4,228,006 10/1980 Hanna .................................. 210/170

Primary Examiner—Ivars Cintins

[57] ABSTRACT

A water conservation apparatus for recycling and reusing water from non-solid discharges in which rinse water discharged from washing machines and dishwashers is captured and reused in subsequent washing operations. The apparatus also includes storage tank in which water discharged from tubs, showers and sinks is captured, stored and then automatically reused at most appropriate times for irrigation purposes. Wastewater from the dishwasher and washing machine, when not recycled, can also be routed to the storage tank, or, alternatively, can be routed directly to a sprinkler system for irrigation purposes.

12 Claims, 1 Drawing Sheet

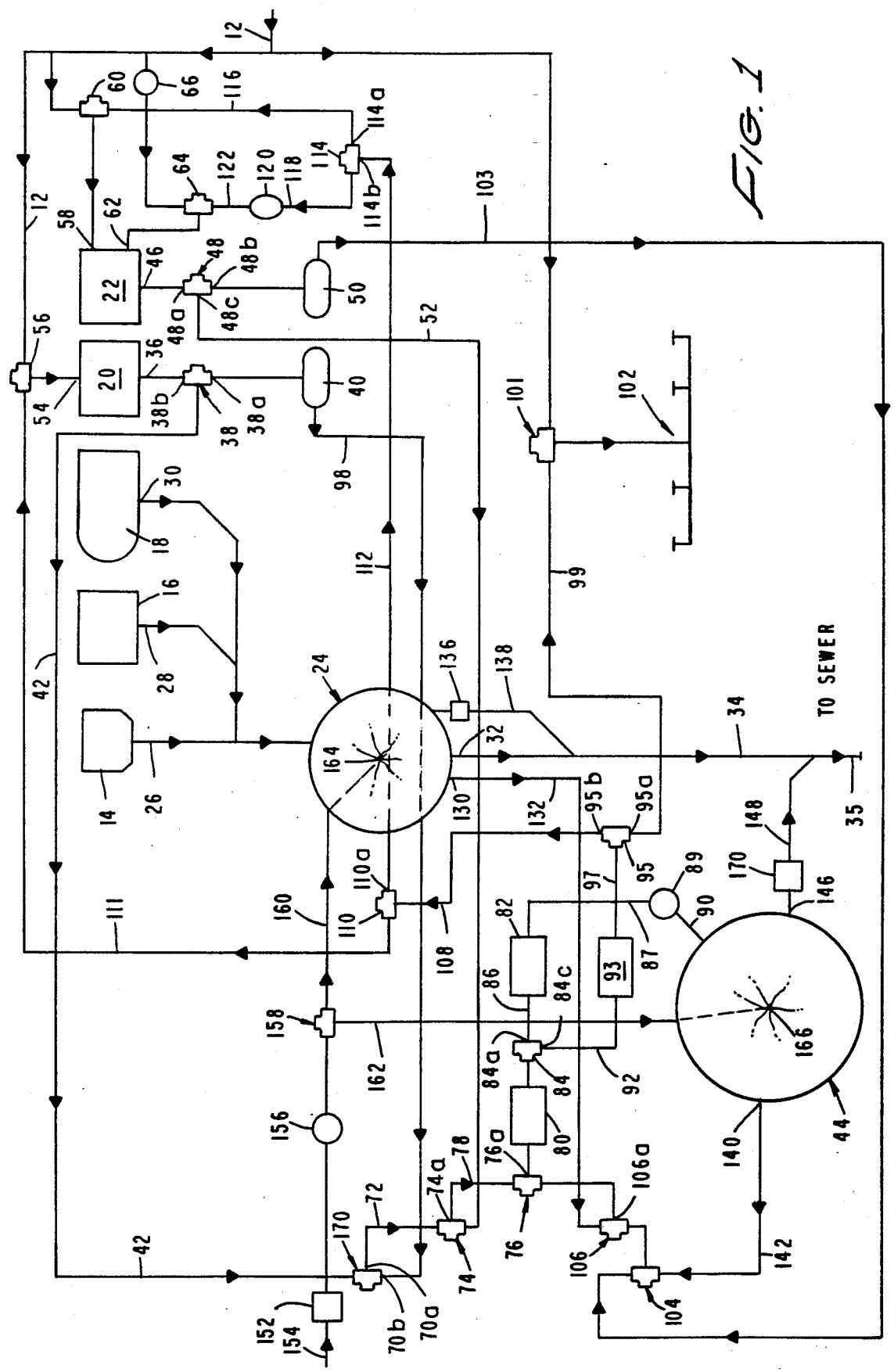

DOMESTIC WATER CONSERVATION SYSTEM

BACKGROUND OF THE INVENTION

1. Field of the Invention

The present invention relates generally to domestic water conservation systems. More particularly the invention concerns an automated system for recycling water from certain appliances and for selectively storing and using certain domestic waste water for irrigation purposes.

2. Discussion of the Invention

In many areas of the world, water is expensive and in short supply. In such areas, various attempts have been made to conserve domestic water supplies. For example, U.S. Pat. No. 4,228,006 issued to Hanna describes a system for reclaiming domestic waste water and reusing it for various purposes. Similarly, U.S. Pat. No. 3,925,206 issued said to Dea describe a system for waste water treatment and disposal.

Many prior art domestic water systems, including the Dea system are primarily concerned with providing disposal systems that can be used in lieu of conventional septic systems and sewage disposal systems. In such systems, water conservation is usually of secondary concern. However, the apparatus of the present invention is concerned primarily with water conservation and embodies means for recycling water used in dishwashers and washing machines and for storing certain types of wastewater for controlled use in connection with irrigation systems.

SUMMARY OF THE INVENTION

It is an object of the present invention to provide a water conservation system for recycling and reusing water from non-solid discharges in which rinse water discharged from washing machines and dishwashers is captured and reused in subsequent washing operations.

Another object of the invention is to provide a water conservation system in which water discharged from tubs, showers and sinks is captured, stored and then automatically reused at most appropriate times for irrigation purposes.

Another object of the invention is to provide a water conservation system of the character described in the preceding paragraphs which embodies strategically interconnected pumping means, filtering means, storage tanks, and sequentially controlled valves for use in selectively recycling, storing and controllably reusing water discharged from various domestic washing fixtures and appliances.

Still another object of the invention is to provide a water conservation system of the class described in which means are provided for periodically cleaning and decontaminating the storage tanks of the system used for interim storage of the wastewater.

Another object of the invention is to provide a water conservation system of the character described in the preceding paragraph in which sprinkler systems are provided for rinsing the interior walls of the storage tank with highly clorinated water.

Yet another object of the invention is to provide a water conservation system as described in the preceding paragraphs which is easy to use and one which readily lends itself to automated control systems including computer controlled systems.

BRIEF DESCRIPTION OF THE DRAWINGS

FIG. 1 is a generally schematic view of the water conservation system of the present invention.

DISCUSSION OF THE INVENTION

Referring to FIG. 1, the water conservation apparatus of one form of the present invention is there shown. The apparatus is adapted for use in connection with a domestic water system of the character having a source of domestic water under pressure 12 and including at least one lavatory sink 14, one shower 16, one bathtub 18, one dishwasher 20 and one washing machine 22. The apparatus of this form of the invention includes a holding tank 24 interconnected with outlet 26 of sink 14 and also with outlets 28 and 30 of shower 16 and tub 18 respectively. For a purpose presently to be described, holding tank 24 is provided with an outlet 32 which is connected to a conduit 34 leading to a domestic sewer line 35.

Dishwasher 20 has an outlet 36 which is connected to a three-port, remote valve 38 which, in turn, is connected via a port 38a to a dishwasher storage tank 40. The remaining port of 38b of valve 38 is connected to a conduit 42 which, in a manner presently to be described, is interconnected to a pump means and to a main storage tank 44 through a series of control valves. Similarly, washing machine 22 has an outlet 46 which is connected to port 48a of a three-port, remote valve 48. Port 48b of valve 48 is connected to a dishwasher storage tank 50, while the remaining port 48c is connected to a conduit 52 which is also connected to the pump means and to main storage tank 44 via a series of control valves. Each of the three-port, remote valves of the system may be electrically or manually operated, are of a type well known to those skilled in the art, and are readily commercially available from several sources including the Purex and Jandy Valve companies.

As indicated in the upper right portion of FIG. 1, dishwasher 20 is provided with a cold water inlet 54 which is connected to domestic water supply 12 via a three-port, remote valve 56. Similarly, washing machine 22 has a cold water inlet 58 which is connected to domestic water supply 12 via a threeport, remote valve 60. The flow of fresh water to these appliances is controlled by appropriate manipulation of valves 56 and 60. Washing machine 22 also has a hot water inlet 62 which is interconnected with domestic water supply 12 via a three-port, remote valve 64 and a conventional hot water heater 66.

The apparatus of the invention can be operated in several modes depending upon the particular needs of the user. For example, by appropriate manual or automatic operation of a series of strategically interconnected control valves, rinse water from the dishwasher and the washing machine can be immediately recycled through the machines for use during their subsequent operating cycles, or it can be pumped directly to interim storage tanks for later use, as for example, for irrigation.

When the rinse water is to be immediately recycled, rinse water, for example from the dishwasher 20, can be diverted from the dishwasher through valve 38 to an interim storage tank 40 where it can be held until a new load of dishes is to be washed. In a manner presently to be described, at the time the new load of dishes is to be washed, the water from storage tank 40 can be called back to the dishwasher via pump means by appropriate operation of valve 38 and can conveniently be used in the wash cycle of a second load of dishes. Alternatively, by appropriate manipulation of valve 38, water from dishwasher 20 can be routed to storage tank 44 for later use, or it can be immediately routed to the domestic sprinkler system.

When the water in storage tank 40 is to be reused in a subsequent wash cycle, the water is pumped from tank 40 into conduit 98, through valves 70, 74, 76 and 84. Valve 84 is manipulated so that the water flows into conduit 92, through filter 93 and on to valve 95. Proper manipulation of valve 95 causes the water to flow to valve 110 and thence to valve 56 via a conduit 111 where it can be directed to the inlet of dishwasher 20.

Water from dishwasher 20 can also be selectively routed to storage tank 44, or to the domestic sprinkler system, via three-port remote valves 70, 74, 76, and 84. More particularly, as indicated in FIG. 1, conduit 42 leads to a three-port, remote valve 70, port 70a of which is interconnected to a conduit 72 which, in turn, leads to a three-port, remote valve 74. Port 74a of valve 74 is connected to a three-port, remote valve 76 by means of a conduit 78. Port 76a of valve 76 is connected to a pump means, shown here as an electric pump 80, which functions to pump water from the dishwasher outlet and direct it through a filter 82 via a three-port, remote valve 84. More particularly, port 84a of valve 84 is interconnected to a conduit 86 which, in turn, is interconnected to filter 82. The outlet of filter 82 is connected to conduit 87 which leads to a chlorination means, or chlorinator 89. Chlorinator 89 is, in turn, connected to main storage tank 44 via a conduit 90. The remaining port 84c of valve 84 is connected to a conduit 92 which leads to a filter 93 which, in turn, is connected to a three-port valve 95 via a conduit 97. Port 95a of valve 95 is connected via a conduit 99 to a valve 101 which controls the previously mentioned sprinkler system, generally designated in FIG. 1 by the numeral 102.

In the mode of operation of the apparatus in which the water from the dishwasher has been routed to storage tank 40 but is not reused in the dishwashing process within a reasonable time, the water can be pumped from tank 40 via a conduit 98 which is interconnected to port 70b of valve 70. Appropriate manipulation of valve 70 permits the water to be pumped from valve outlet 70a through conduit 72 to valve 74, thence to valve 76, and finally to storage tank 44 via pump 80, valve 84, filter 82 and chlorinator 89. Alternatively, if conditions dictate that the wastewater be immediately used for irrigation purposes, proper manipulation of valves 84, 95 and 101 will permit the wastewater to flow directly to the sprinkler system 102 rather than to the storage tank.

In a similar manner, water from the washing machine 22 can be immediately recycled through the washing machine, or alternatively, it can be pumped to the main storage tank 44 or to the sprinkler system in a manner similar to that described in connection with the wastewater from dishwasher 20. More particularly, in the immediate recycle mode of operation of the washing machine subsystem, water from the washing machine is conducted to storage tank 50 via valve 48. The water stored in tank 50, which is rinse water from the previous load of laundry, will remain stored in tank 40 until a new load of laundry is to start. At this time, water in tank 50 will be pumped through the system for the next wash cycle. As will be discussed in the following paragraph, the water may be reheated if desired. Alternatively, water can be routed directly to the washing machine without reheating.

When the water stored in storage tank 50 is to be immediately recycled, it flows from tank 50 through conduit 103, which, as shown in the lower left-hand portion of FIG. 1, is interconnected with three-port, remote valve 104. Valve 104 is, in turn, interconnected with a three-port, remote valve 106, port 106a of which is interconnected with valve 76 which, in turn, is connected to pump 80. Appropriate manipulation of valve 84 causes the wastewater to flow through port 84c of valve 84 and on to filter 93 via conduit 92. Filter 93 is, in turn, interconnected with three-port, remote valve 95. Port 95b of valve 95 is connected to valve 110 via conduit 108. Port 110a of valve 110 is interconnected with a conduit 112 which, in turn, is interconnected with a three-port, remote valve 114. Port 114a of valve 114 is interconnected with a conduit 116 which, in turn, leads to valve 60, which controls the cold water input to the washing machine via inlet 58. The remaining port of valve 114, designated in the drawings as 114b, is connected to a conduit 118 which leads to a heating unit 120. The outlet of heating unit 120 is connected to a conduit 122 which leads to valve 64 which valve controls the hot water input to the washing machine via inlet 62. By appropriate manipulation of valve 114, the rinse water can be diverted either to heating unit 120 for reheating, or to conduit 116 for direct input to the washing machine via valve 60.

Should immediate recycling of the wastewater from the washing machine not be desired, the wastewater can be directed to the storage tank 44 via valve 48, conduit 52, valves 74, 76 and 84, conduit 87 and chlorinator 89. Alternatively, the wastewater can immediately be used for irrigation purposes by routing the water to sprinkler system 102 via valve 48, conduit 52, valves 74, 76, and 84, conduit 92, filter 93, conduit 97, valve 95, conduit 99 and valve 101.

Referring again to the intermediate holding tank 24 which receives discharge water from the bathroom sink, the shower and the tub, water may be drained from this holding tank through outlet port 130 to conduit 132 which is interconnected with valve 106. As previously mentioned, valve 106 is interconnected with pump 80 via valve 76 so that water from the holding tank may be pumped from the holding tank through valve 84, filter 82, chlorinator 89 and into conduit 90 which leads to storage tank 44. Alternatively, water can be discharged from holding tank 24 to the domestic sewer line via a control valve 136 which controls the flow of water through a conduit 138 into conduit 34 leading to the domestic sewer system.

Considering once again the use of water contained within main storage tank 44, it is to be noted that water from the main storage tank can be pumped through an outlet 140 into a conduit 142 which is connected with valve 104. Valve 104 is interconnected with pump 80 via valves 106 and 76 so that water can be pumped from main tank 44 to valve 84, through filter 93 and toward the sprinkler system via control valves 95 and 101. By opening a valve 170, water retained in main storage tank 44 can also be drained to the domestic sewer line via outlet 146 which is connected to conduit 148 which, in turn, is interconnected with sewer line 34.

Another novel feature of the apparatus of the invention resides in the provision of means for periodic cleaning and disinfecting of storage tanks 24 and 44. In the form of the apparatus of the invention shown in FIG. 1, this means comprises an electric gate valve 152 which controls the flow of domestic water under pressure from a domestic water source 154 toward a second chlorination means or unit 156, which unit 156 is also of a character well known to those skilled in the art, is interconnected via three-port remote valve 158 to conduits 160 and 162. Conduit 160 is connected to a cleaner sprinkler 164 which is mounted on top of tank 24 while conduit 162 is connected to a cleaner sprinkler 166 which is mounted on top of tank 44. Sprinklers 164 and 166 are constructed and arranged so that, once tanks 24 and 44 are drained, chlorinated water can be controllably sprayed onto the bottom and side walls of the tanks to cleanse the tanks and prevent bacteria build-up. Tank 24 can be conveniently drained by force of gravity through conduit 138 upon opening of electric gate valve 136. Similarly, tank 44 can be conveniently drained through conduit 148 upon opening of electric gate valve 170.

It is to be understood that, in the preferred form of the invention, all of the valves, including the three port and gate valves are electrically operated by a suitable source of electricity. Operation of the valves is preferably accomplished automatically in accordance with a planned sequence of operation which can be appropriately varied to meet the particular requirements of the user. For example, during the summer months, the system can be operated to provide maximum irrigation capability. Conversely, during the winter months, greater use of the recycling capability of the system can be utilized.

Where several different appliances are interconnected with the conservation system, and when the system is particularly complex, sequence of operation of the various control valves can be computer controlled in accordance with computer programs of a character that can readily be developed by those skilled in the art.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without department from the scope and spirit of the invention, as set forth in the following claims.

I claim:

1. A water conservation apparatus in connection with a domestic water system having a source of water under pressure, at least one lavatory sink having an outlet, at least one bathtub having an outlet, at least one shower having an outlet, a dishwasher having an inlet and an outlet, a washing machine having an inlet and an outlet, and an outdoor multi-outlet irrigation system, said water conservation apparatus comprising:
   (a) a main storage tank;
   (b) a dishwasher recycling subsystem interconnected with said main storage tank, comprising:
      (i) a dishwasher storage tank having an inlet and an outlet;
      (ii) a first conduit having first and second ends, said first end being connected to said dishwasher outlet;
      (iii) a valve having first, second and third ports, said first port being connected to said second end of said first conduit;
      (iv) a second conduit interconnecting said second port of said valve with said main storage tank;
      (v) a third conduit interconnecting said third port of said valve with said dishwasher storage tank;
      (vi) means for causing water within said dishwasher storage tank to flow toward said inlet of said dishwasher;
   (c) a holding tank having an inlet interconnected with at least one of said lavatory sink outlet, said bathtub outlet, and said shower outlet and having an outlet interconnected with said main storage tank; and
   (d) means interconnecting said main storage tank with said irrigation system for causing water contained within said main storage tank to flow to said irrigation system.

2. An apparatus as defined in claim 1 further including a washing machine recycling subsystem interconnected with said main storage tank, comprising:
   (a) a washing machine storage tank having an inlet and an outlet;
   (b) a first conduit having first and second ends, said first end being connected to aid washing machine outlet;
   (c) a valve having first, second, and third ports, said first port being connected to said second end of said first conduit;
   (d) a second conduit interconnecting said second port of said valve with said main storage tank;
   (e) a third conduit interconnecting said third port with said washing machine storage tank;
   and (f) means for causing water within said washing machine storage tank to flow to said inlet of said washing machine.

3. An apparatus as defined in claim 1 further including decontamination means for decontaminating said main storage tank.

4. An apparatus as defined in claim 1 further including decontamination means for decontaminating said holding tank.

5. An apparatus as defined in claim 1 in which said dishwasher recycling subsystem further includes filter means for filtering water flowing from said dishwasher outlet.

6. An apparatus as defined in claim 1 in which the domestic water system includes a sewer and in which said apparatus further includes means interconnecting said main storage tank with the sewer for permitting fluid to flow from said main storage tank toward the sewer.

7. An apparatus as defined in claim 6 in which said apparatus further includes means interconnecting said holding tank with the sewer for permitting fluid to flow from said holding tank toward the sewer.

8. A water conservation apparatus in connection with a domestic water system having a source of water under pressure, at least one lavatory sink having an outlet, at least one bathtub having an outlet, at least one shower having an outlet, a dishwasher having an inlet and an outlet, a washing machine having an inlet and an outlet, and an outdoor multi-outlet irrigation system, said water conservation apparatus comprising:
   (a) a main storage tank;
   (b) a washing machine recycling subsystem interconnected with said main storage tank, comprising:
      (i) a washing machine storage tank having an inlet and an outlet;
      (ii) a first conduit having first and second ends, said first end being connected to said washing machine outlet;
      (iii) a valve having first, second and third ports, said first port being connected to said second end of said first conduit;

(iv) a second conduit interconnecting said second port of said valve with said main storage tank;
(v) a third conduit interconnecting said third port with said washing machine storage tank; and
(vi) means for causing water within said washing machine storage tank to flow to said inlet of said washing machine;

(b) a holding tank having an inlet interconnected with at least one of said lavatory sink outlet, said bathtub outlet, and said shower outlet and having an outlet interconnected with said main storage tank; and (c) means interconnecting said holding tank and said main storage tank for causing liquid contained within said holding tank to flow to said main storage tank.

9. An apparatus as defined in claim 8 further including decontamination means for decontaminating said main storage tank.

10. An apparatus as defined in claim 8 further including decontamination means for decontaminating said holding tank.

11. An apparatus as defined in claim 8 in which said washing machine recycling subsystem further includes filter means for filtering water flowing from said washing machine outlet.

12. A water conservation apparatus in connection with a domestic water system having a source of water under pressure, at least one lavatory sink having an outlet, at least one bathtub having an outlet, at least one shower having an outlet, a dishwasher having an inlet and an outlet, a washing machine having an inlet and an outlet, and an outdoor multi-outlet irrigation system, said water conservation apparatus comprising:

(a) a main storage tank;
(b) a dishwasher recycling subsystem interconnected with said main storage tank, comprising:
  (i) a dishwasher storage tank having a inlet and an outlet;
  (ii) a first conduit having first and second ends, said first end being connected to said dishwasher outlet;
  (iii) a valve having first, second and third ports, said first port being connected to said second end of said first conduit;
  (iv) a second conduit interconnecting said second port of said valve with said main storage tank;
  (v) a third conduit interconnecting said third port of said valve with said main storage tank;
  (vi) means for causing water within said dishwasher storage tank to flow toward said inlet of said dishwasher; and
  (vii) filter means for filtering water flowing from said dishwasher outlet;

(c) a washing machine recycling subsystem interconnected with said main storage tank, comprising:
  (i) a washing machine storage tank having an inlet and an outlet;
  (ii) a first conduit having first and second ends, said first end being connected to said washing machine outlet;
  (iii) a valve having first, second and third ports, said first port being connected to said second end of said first conduit;
  (iv) a second conduit interconnecting said second port of said valve with said main storage tank;
  (v) a third conduit interconnecting said third port with said washing machine storage tank;
  (vi) means for causing water within said washing machine storage tank to flow to said inlet of said washing machine; and (vii) filter means for filtering water flowing from said washing machine outlet:

(d) a holding tank having an inlet interconnected with said lavatory sink outlet, said bathtub outlet, and said shower outlet and having an outlet interconnected with said main storage tank;

(e) means interconnecting said holding tank and said main storage tank for causing liquid contained within said holding tank to flow to said main storage tank;

(f) means interconnecting said main storage tank with said irrigation system for causing water contained within said main storage tank to flow to said irrigation system;

(g) decontamination means for decontaminating said main storage tank; and (h) decontamination means for decontaminating said holding tank.

* * * * *